United States Patent [19]

Freese

[11] 3,739,594
[45] June 19, 1973

[54] METHOD AND APPARATUS FOR DRYING COMPRESSED AIR

[76] Inventor: Charles E. Freese, 2916 Homer Avenue, Erie, Pa. 16506

[22] Filed: Jan. 21, 1972

[21] Appl. No.: 219,657

[52] U.S. Cl. .................. 62/93, 62/101, 62/238, 62/331, 62/331, 62/476
[51] Int. Cl. ............................................ F25b 15/00
[58] Field of Search .................. 62/101, 238, 148, 62/331, 476, 93

[56] References Cited
UNITED STATES PATENTS
1,792,227   2/1931   Kuhl ............................... 62/148 X
2,339,185   1/1944   Nettel .............................. 62/238 X
654,577     7/1900   Abrams .......................... 62/238 X FOREIGN PATENTS OR APPLICATIONS
1,942,078   4/1971   Germany ........................... 62/476
453,513    11/1927   Germany ........................... 62/238

Primary Examiner—William F. O'Dea
Assistant Examiner—Peter D. Ferguson
Attorney—Ralph Hammar

[57] ABSTRACT

The heat of compression of compressed air heats the generator of an absorption refrigeration system to dry the air. An auxilliary heater for the generator supplies stand by heat when the compressor is not operating.

4 Claims, 1 Drawing Figure

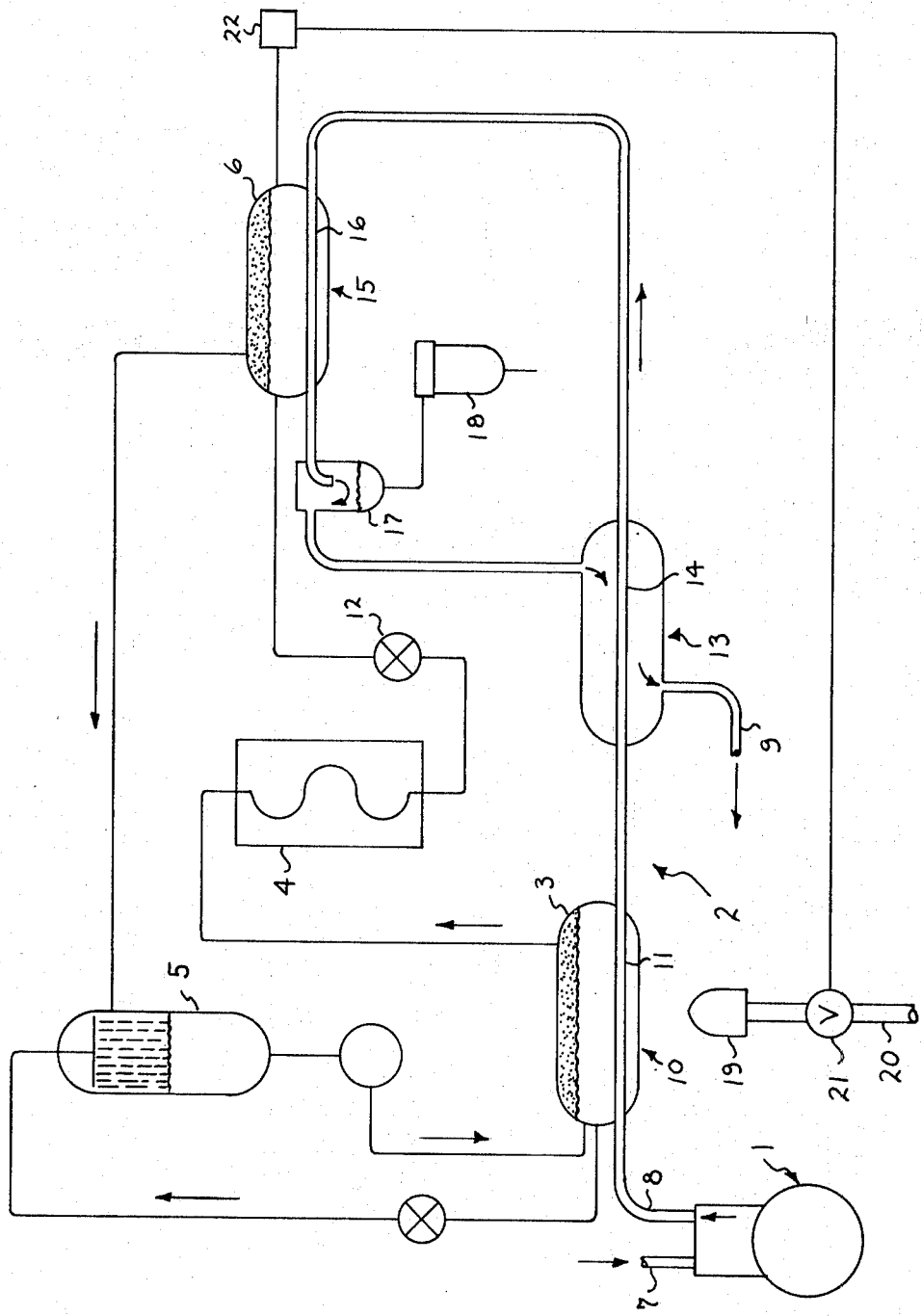

METHOD AND APPARATUS FOR DRYING COMPRESSED AIR

This invention relates to a method of removing moisture from compressed air by cooling with absorption refrigeration wherein the heat needed to generate the refrigeration is obtained from the compressed air itself.

In the drawing, the single FIGURE is a diagram of a preferred form of compressed air system.

In the drawing, 1 indicates the compressor and 2 the absorption refrigeration system of which the major units are the generator 3, the condenser 4, the absorber 5 and the evaporator 6. Air at ambient temperature enters the compressor intake 7 and is discharged through the compressor outlet 8 at a temperature of about 350°F due to the heat of compression. After passing through heat exchangers (to be described) associated with the absorption refrigeration system, the air in a dried state and at near ambient temperature is discharged through line 9 ready for use in air operated tools and equipment. The heat of compression is sufficient to operate the absorption refrigeration system and provide the cooling effect required to lower the dew point far enough so that moisture is not released in the compressed air line and in the air operated tools and equipment.

The first heat exchanger 10 is between the inlet line 11 and the generator 3. The heat transferred from the incoming compressed air at about 350°F lowers the incoming air temperature to about 200°F and correspondingly increases the temperature in the generator, driving refrigerant (e.g. ammonia) out of solution into the condenser 4 where it is cooled and condensed and discharged through a pressure reducing valve 12 into the evaporator 6.

The second heat exchanger 13 is between a continuation 14 of inlet line 11 and air returning to line 9 after being cooled by the evaporator 6. The returning air at a temperature of about 40°F is heated to about 150°F by the 200°F air leaving the first heat exchanger 10. In the heat exchange process the temperature of air in line 14 is reduced to about 100°F. The second heat exchanger 13 may be replaced by other heat exchangers capable of reducing air temperature to near ambient, such as a conventional after cooler or a fan cooled air to air heat exchanger, either of which will reduce the 200°F air temperature leaving the first heat exchanger to near 100°F. The second heat exchanger is needed to reduce the temperature of the air so that full advantage can be taken of the sub ambient cooling effect of the evaporator in removing moisture from the air by reducing the air temperature well below ambient. The moisture content of the air is determined by its lowest temperature.

The third heat exchanger 15 is between the evaporator 6 and continuation 16 of line 14. This heat exchanger cools the air to about 40°F, a temperature far enough below ambient to cause enough moisture to drop out due to the lowered dew point so no moisture will be released in the air operated tools and equipment. The moisture is caught in a trap 17 and periodically released through a float valve 18. The refrigerant boiled off in the evaporator is recycled back through the absorber 5 to the generator 3. The cooled air leaving heat exchanger 15 is returned through heat exchanger 13 to line 9.

For intermittent operation, which is most common, a stand by heater 19 is provided to keep the absorption system in readiness for cooling. The heater 19 can be a gas burner fed from gas line 20 through a valve 21 controlled by the refrigerator temperature control 22. When the compressor is loaded, the burner flame can be reduced by partially or wholly closing the valve 21. When the compressor is unloaded, and no air is being compressed, the burner flame can be increased to a value sufficient to maintain the absorption system in stand by condition.

Starting with a heating medium at 350°F, the commercially available absorption refrigerating systems required about 2 Btu input for each Btu of cooling. In the present system, there is nearly 3 Btu input $[(350°-200°)/(100°-40°)]$ for each Btu of cooling. There accordingly is usually enough heat in the compressed air itself to dry the air. If the heat of compression is not adequate, any deficiency can be supplied by the gas burner 19. If the heat of compression is more than adequate, the surplus cooling can be used for other purposes such as cooling the cylinder water jacket of the compressor 1.

Other heat exchangers may be added to reduce air temperature if desired. They may be inserted at the outgoing line or between heat exchanger 10 and 13.

It is expected that other types of absorption refrigeration systems such as those using lithium bromide may be used. The type used would depend on operating conditions and other considerations out of the scope of this invention.

What is claimed is:

1. The method of drying compressed air which comprises the steps of
   1. cooling a stream of compressed air containing heat of compression and unwanted moisture by passing it in heat exchange relation to the generator of an absorption refrigeration system,
   2. further cooling the compressed air leaving step (1) by passing it in heat exchange relation to the compressed air leaving step (3), thereby reheating the compressed air leaving step (3),
   3. further cooling the compressed air leaving step (2) by passing it in heat exchange relation to the evaporator of said absorption refrigeration system,
   4. trapping moisture which drops out of the air as it is cooled.

2. The method of claim 1 in which stand by heat is supplied to the generator during periods when air is not being compressed so as to maintain the absorption refrigeration system in readiness for drying.

3. Apparatus for drying a stream of compressed air containing heat of compression and unwanted moisture comprising an absorption refrigeration system including a generator, an evaporator and associated condensing and absorbing means, a first heat exchange means between said generator and said stream of compressed air for heating the generator by transferring the heat of compression to the generator, a second heat exchange means for further cooling the air leaving the first heat exchange means comprising an air to air heat exchanger between the air leaving the first heat exchange means and the air leaving a third heat exchange means for further cooling the air leaving the first heat exchange means by transferring heat to the air leaving the third heat exchange means, the third heat exchange means being between the air leaving the second heat exchange means and said evaporator for still further cooling the air leaving the second heat exchange means by transferring heat to the evaporator, and means for trapping moisture which drops out of the air as it is cooled.

4. The apparatus of claim 3 having a stand by heater for the generator during periods when air is not being compressed so as to maintain the absorption refrigeration system in readiness for drying.

* * * * *